Patented Jan. 13, 1925.

1,522,793

UNITED STATES PATENT OFFICE.

MAX O. SCHAEFER AND EMIL FREY, OF MONROE, NEW YORK, ASSIGNORS TO VELVEETA CHEESE COMPANY, INC., OF MONROE, NEW YORK, A CORPORATION OF NEW YORK.

APPARATUS FOR TREATING CHEESE.

Application filed August 10, 1923. Serial No. 656,714.

*To all whom it may concern:*

Be it known that we, MAX O. SCHAEFER and EMIL FREY, citizens of the United States, residing at Monroe, in the county of Orange and State of New York, have invented certain new and useful Improvements in Apparatus for Treating Cheese, of which the following is a specification.

The invention to be hereinafter described relates to apparatus for treating cheese.

Heretofore, commercial cheeses have been converted into what is called remade cheese by the following process. The cheeses are cut into pieces which are passed through a grinding machine to comminute the same. Then the cheese is subjected to heat and stirred for a predetermined length of time. When the cheese has the desired consistency and character, it is poured into molds and wrapped to form packages for commercial distribution.

The aim and purpose of the present invention is to provide apparatus for so remaking cheeses as to produce a product of improved quality. In carrying the invention into practical effect, the comminuted cheese is placed into a kettle and heated by introduction of steam directly into the cheese mass in the presence of a partial vacuum. Projecting into the kettle are stirring devices which plow through or open up the cheese mass so as to enable the steam to be distributed therein and reach the same uniformly throughout. The heating effect of the steam is continued for a sufficient period to give the cheese a uniform consistency and homogeneous character. The introduction of steam into the cheese mass is arrested before the same has been heated to the point of pasteurization or sterilization.

I have found that to produce cheese of the desired quality, it is necessary that the steam introduced into the kettle shall be dried or have moisture removed therefrom. The steam may be dry or carry a small amount of moisture, but to obtain good results the steam should not carry a substantial volume of water into the cheese. Otherwise, liquid will stand on the surface of the cheese in the kettle, with objectionable effect. A purpose of the invention, therefore, is to provide simple and efficient means for removing moisture from the steam which is introduced into the kettle.

In establishing the vacuum effect in the kettle, means is provided to prevent the cheese from being drawn into the vacuum pipe which leads to the kettle, and means is provided to prevent water of condensation from the steam carried away by the vacuum pipe from flowing back into the kettle.

With the aforesaid and other purposes in view, the character of the invention will be best understood by reference to the following description of one good form thereof, shown in the accompanying drawings, wherein.

Figure 1:
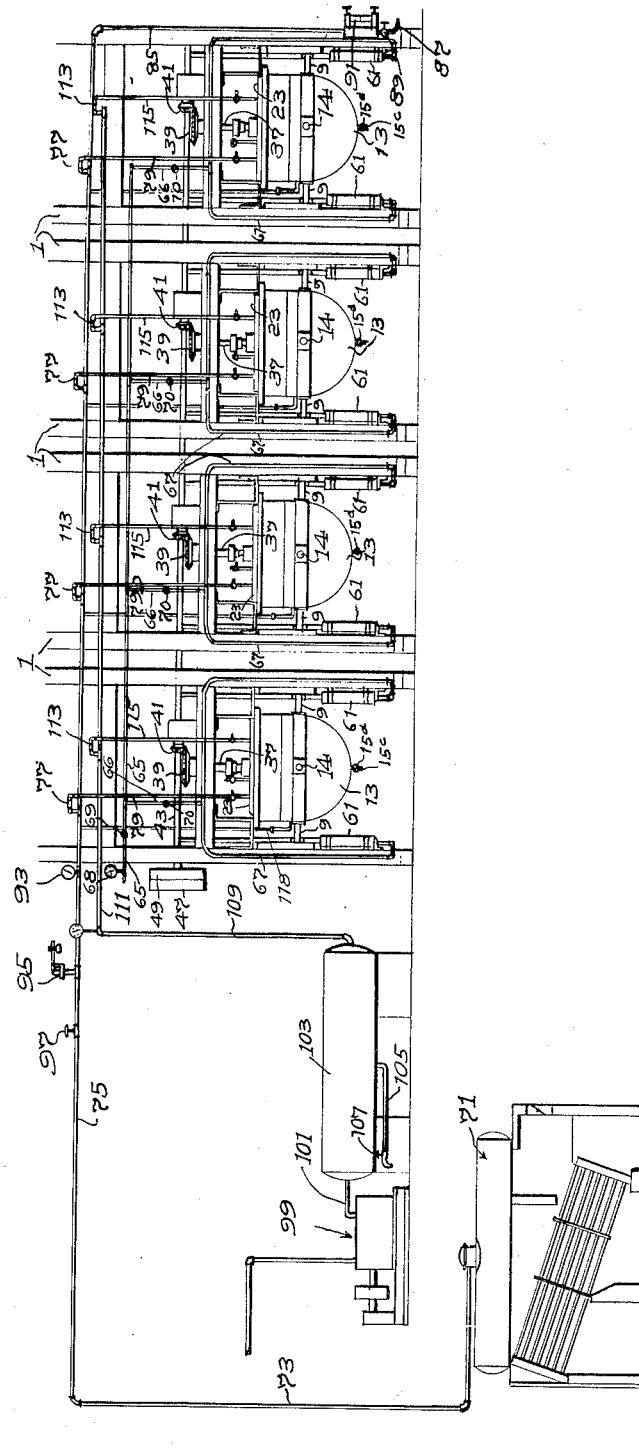
Fig. 1 is a side elevation of apparatus embodying the invention.
Figure 2:
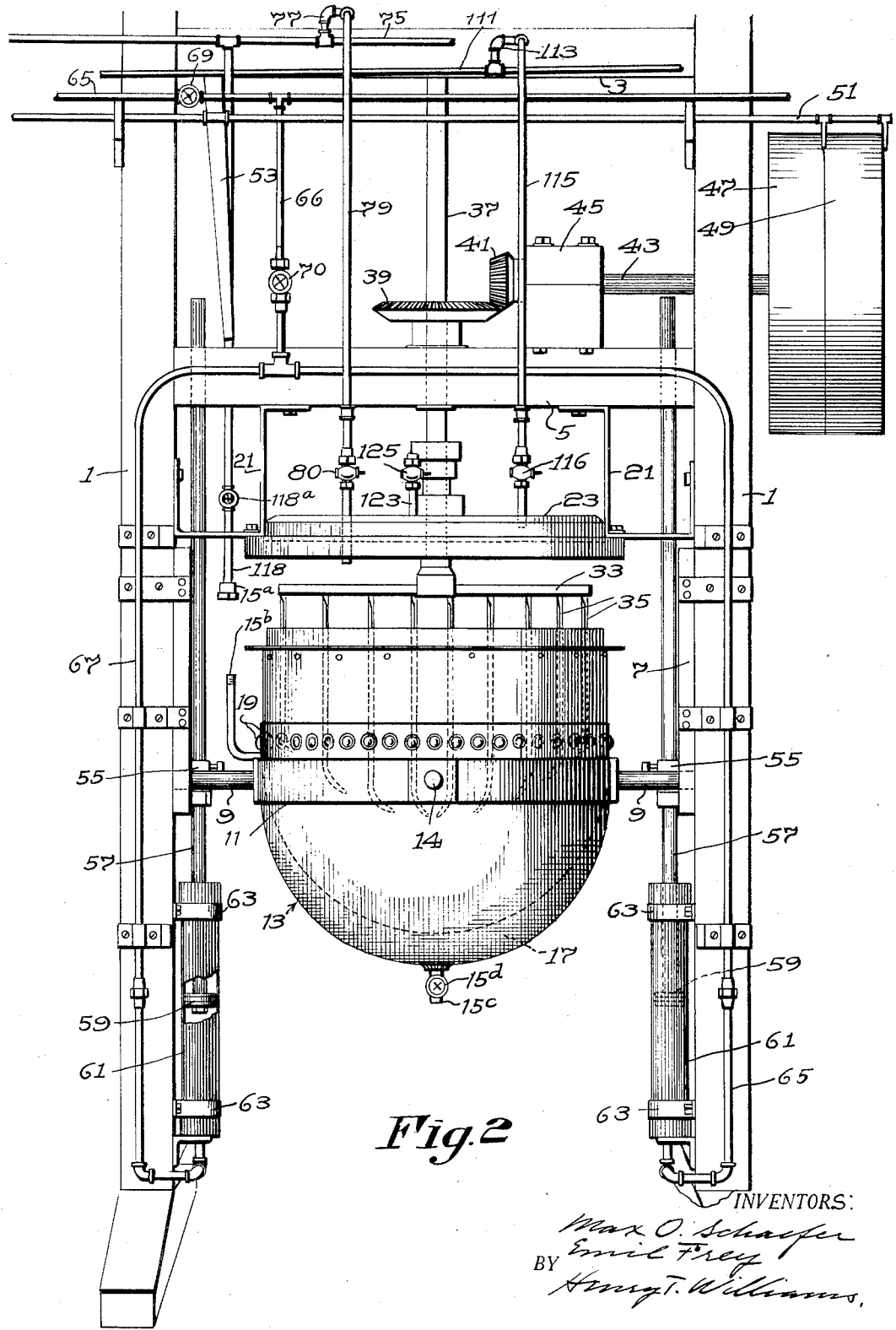
Fig. 2 is a side elevation of the kettle, its support and piping leading thereto, the body of the kettle being shown in lowered position away from its cover.
Figure 3:
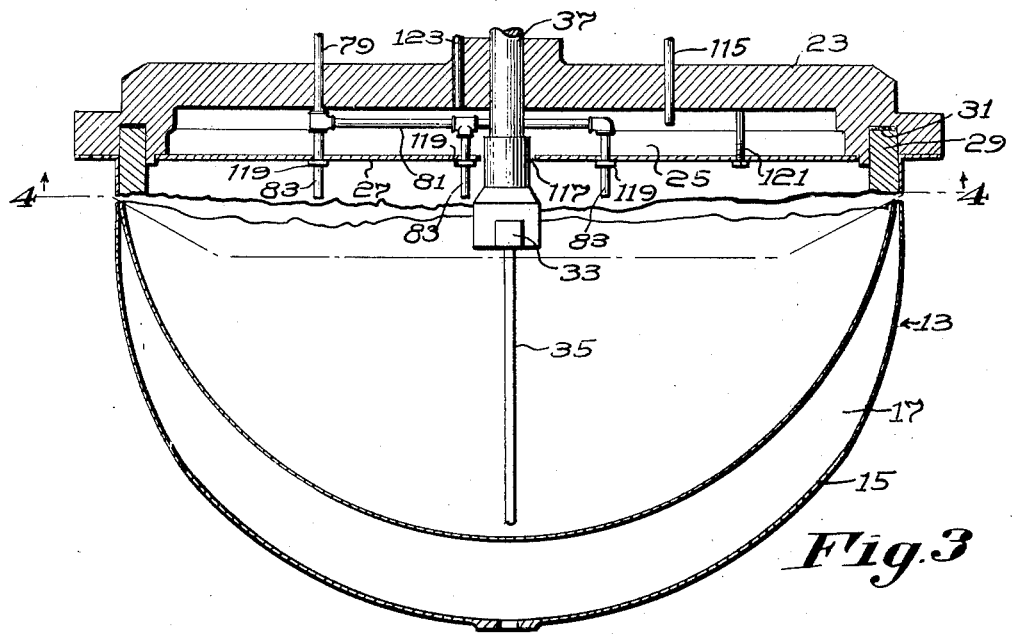
Fig. 3 is a vertical section through the cover and a portion of the body of the kettle.

Referring to the drawings, the apparatus shown therein as one good form of the invention, comprises a support conveniently in the form of a frame having uprights 1 connected at their upper ends by a cross member 3, and also connected by a cross member 5 beneath and spaced from the top cross member. Secured to the uprights are guideways 7 adapted to receive trunnions 9 projecting diametrically oppositely from a band 11 embracing the body 13 of the kettle. Also projecting from the band are a pair of handles 14 adapted to be grasped in transferring the kettle to and from a truck, as more fully hereinafter described. The body desirably may have a bottom portion of substantially hemispherical form, and attached thereto is a shell 15 providing a space 17 serving as a steam jacket for the bottom portion of the kettle, said shell being secured to the body by a series of rivets 19.

Secured to the uprights and the cross member 5 are brackets 21 supporting the kettle cover 23 which has a recess 25 on the under side thereof covered by a thin disk plate 27 having its margin seated in a rabbet formed in the cover. The cover has a groove 29 in the flange thereof provided with a gasket 31 adapted to be engaged by the upper edge of the body of the kettle, in order to prevent leakage between the body and cover.

Figure 4:
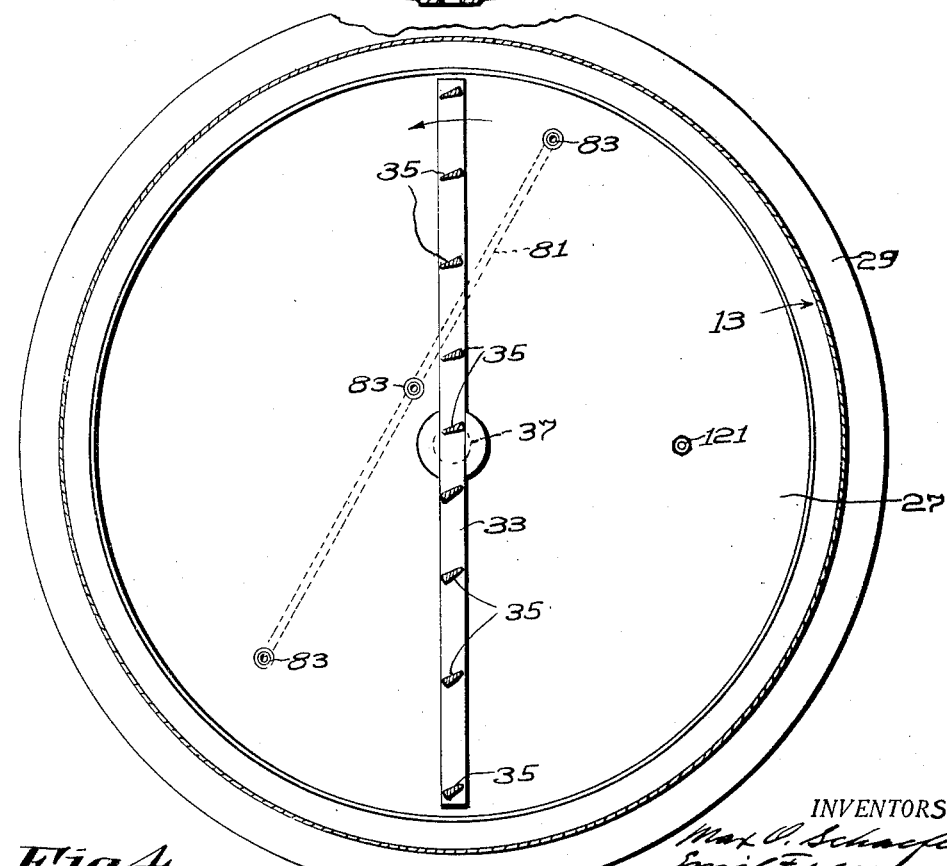
Fig. 4 is a horizontal section taken on line 4—4 of Fig. 3.

Suitable means may be provided to stir and open up the cheese mass in the kettle. This means, in the present instance of the invention, comprises a bar 33 having a series of stirrers or arms 35 depending therefrom. These arms are of a general wedge-shaped section, have lower ends curved to conform to the contour of the body of the kettle, are set on the bar in the vertical plane of the bar, and are so disposed that transversely they are oblique to the length of the bar, as will be noted in Fig. 4. Also the arms are staggered or set at varying distances apart. The construction is such that the arms will plow through and form furrows or open up the entire cheese mass in the course of each complete rotation of the stirring means, and permit the steam to enter into and reach the cheese mass uniformly throughout. When the bar and the arms are rotated in the direction of the arrow (Fig. 4), the arms will tend to throw the cheese inward toward the center of the kettle.

The bar 33 of the stirring device is mounted fast on a vertical shaft 37, which projects upward through the disk plate 27 and the cover 23, and said shaft is journalled in bearings in the cross members 3 and 5. Fast on the shaft is a bevel gear 39 meshing with a bevel pinion 41 fast on a shaft 43 journalled in a bearing 45 mounted on the cross member 5 and journalled in a bearing in one of the uprights 1. Fast on this shaft are tight and loose pulleys 47 and 49 adapted to receive a belt connected to an electric motor or other suitable source of power. A belt shifter 51 is supported by the uprights 1 and provided with a handle 53.

Suitable means may be provided to raise the body of the kettle to the cover and to lower the same therefrom. This means, in the present instance, comprises heads 55 receiving the trunnions 9 and secured to stems 57 having pistons 59 in cylinders 61 secured by straps 63 to the uprights 1. The stems may extend up through and be guided by holes in the cross member 5.

A battery of kettles such as described may be provided, and in Fig. 1 a battery of four kettles is shown. The main pipe 65 may receive hydraulic or other pressure from a suitable source, and conduct the same to branch pipes 66 connected to U-shaped pipes 67 having their lower ends connected to the bottom heads of the pairs of cylinders 61 for the kettles. The main pipe 65 is provided with a pressure gage 68 and a valve 69, and each of the branch pipes 66 is provided with a valve 70. The construction is such that when hydraulic pressure is admitted into the cylinders 61, the pistons 59 and their stems 57 will elevate the body of the kettle to the cover, so that the upper edge of the body will seat tightly against the gasket 31 in the groove of the cover. When it is desired to lower the body, the hydraulic pressure is gradually released, thereby allowing the pistons to move downward in the cylinders. The kettle is lowered a sufficient distance to enable the body of the kettle to clear the lower ends of the stirrers. Then the kettle is transferred to a truck (not shown) by which the kettle may be conveyed to the place where the cheese is poured from the kettle and formed into molds.

Steam may be supplied to the kettles from a steam boiler conventionally indicated on a small scale at 71. A main steam pipe leads from the boiler, and comprises a vertical pipe 73 and a nearly horizontal pipe 75. Projecting from the upper side of the main pipe 75 are elbows 77 of vertical pipes 79 which extend down to and project through the covers, said pipes 79 being provided with valves 80. Each of these vertical pipes 79 is connected to a horizontal pipe 81 located in the cover recess 25, and provided with three steam distributing nozzles 83 suitably located to distribute the steam into the furrows opened up in the cheese mass by the stirrer arms.

To prevent moisture in the steam from entering the kettles, the pipe 75 may have a slight inclination, such, for example, as one inch drop in ten feet, and a vertical drain pipe 85 may be connected to the pipe 75, and may have an open end 87. The pipe 85 is provided with a valve 89 and a water gage 91. The valve 89 is adjusted to provide the small opening sufficient to allow water of condensation to drip from the end 87 of the pipe, and yet cause a water column to stand above the valve and prevent escape of steam from the pipe 85.

The construction is such that moisture or water of condensation in the steam will gravitate through the pipe 75 to the drain pipe 85, and since the elbows 77 for the pipes 79 lead from the upper side of the main pipe, the water of condensation will not enter the elbows 77 and the pipes 79, and therefore, will not enter the kettles.

The main pipe 75 may be provided with a pressure gage 93, a steam regulating valve 95, and a valve 97 for controlling the flow of steam.

To produce the vacuum effect in the kettles, a vacuum pump 99 may be provided of usual construction, and may be connected by a pipe 101 with a vacuum tank 103. A drain pipe 105 is connected to the vacuum tank, and provided with a valve 107. A main pipe 109 projects upward from the vacuum tank to a nearly horizontal pipe 111 connected by elbows 113 and vertical pipes 115 with the kettle covers, said pipes 115 being provided with valves 116.

The construction is such that a vacuum effect is established in the spaces between the kettle covers and the plates 27. Each of the plates has an opening 117 somewhat larger than the stirrer shaft, and has a loose fit in the cover rabbet, so that the vacuum effect is transmitted into the body of the kettle. The steam is drawn from the kettles through the branch pipes 115 and the pipes 111 and 109 into the vacuum tank.

The steam distributing nozzles preferably have small delivery openings, such for example, as $\frac{1}{16}''$ diameter each; and the vacuum pipe has a small opening, such for example, as $\frac{3}{8}''$ diameter. The consequence is that the air and steam are drawn by the vacuum means slowly from the kettle, and the suction effect is not sufficiently great to prevent water of condensation from the steam from flowing to its lowest gravity point. Therefore, to prevent the condensation from flowing in the pipe 111 back into the kettle, said pipe may have an inclination, such, for example, as a drop of one inch in ten feet, in order to allow water of condensation in the steam to gravitate through the pipe 111 and into the pipe 109, and thence into the vacuum tank. From time to time the water of condensation may be discharged from the vacuum tank through the pipe 105.

To supply steam to the jacket between the shell 15 and the bottom of the kettle, a pipe 118 may lead from the steam pipe 75 down to a point adjacent the top of the kettle. Said pipe 118 may be provided with a valve 118ª and may be detachably connected by a coupling 15ª with a short pipe 15ᵇ projecting from the kettle and communicating with the jacket. Water of condensation may be drawn from the jacket through a short pipe 15ᶜ connected to the shell 15 and provided with a valve 15ᵈ.

The disk plate 27 may be secured to the cover by suitable means, in the present instance, comprising nuts 119 on the nozzles 83 and a screw bolt 121 connected to the cover. To permit admission of atmospheric pressure into the kettle to destroy the vacuum effect, the cover may be provided with a short pipe 123 provided with a valve 125.

In the use of the apparatus, the comminuted cheese is introduced into the body of one of the kettles, and then hydraulic pressure is admitted into the cylinders 61, thereby elevating the body of the kettle to its cover. Then the vacuum escape valve 125 is closed, the steam admission valve 80 and the vacuum admission valve 116 are opened, and the belt shifter is moved to shift the belt to the tight pulley, thereby causing rotation of the stirrer. The steam admitted into the kettle is distributed by the nozzles 83 into the furrows or openings produced by the stirrer arms, and thus the steam is uniformly distributed throughout the mass of the cheese. The vacuum effect produced in the kettle enables the cheese to be sufficiently heated at a temperature sufficiently low to prevent pasteurization or sterilization of the cheese.

After the process has been carried on a sufficient length of time to produce cheese of the desired quality, the steam admission valve 80 and the vacuum admission valve 116 are closed, and the vacuum escape valve 125 is opened, thereby admitting atmospheric pressure into the kettle. Then the hydraulic pressure on the cylinders 61 is released, thereby to lower the body of the kettle from its cover. The kettle body may be tilted to pour the cheese mass into a suitable receptacle, from which the cheese may be poured into molds.

The battery of kettles may be operated in turn, so that the comminuted cheese may be introduced into the kettles and the treated cheese may be poured therefrom successively. The operations may be so timed that the operator may attend the kettles in turn.

If the temperature of the room containing the apparatus falls below a certain temperature, steam may be admitted into the jacket to contribute to heating the cheese, but if the temperature of the room is above this point, the heating by the jacket is unnecessary.

It will be understood that the invention is not limited to the specific embodiment shown, and that various deviations may be made therefrom without departing from the spirit or scope of the appended claims.

What is claimed is:—

1. Apparatus for treating cheese comprising, in combination, a support, a cover carried by said support, a kettle for receiving cheese charges, means for raising the kettle to and lowering the same from the cover, a rotary stirrer carried by the support and adapted to project into the kettle when the latter is raised to the cover, said stirrer having provision for reaching and stirring substantially the entire charge of cheese in the kettle, means for introducing dried steam into the kettle, and vacuum means for drawing the steam from the kettle.

2. Apparatus for treating cheese comprising, in combination, a container, a cover therefor, means relatively to move the container and cover to permit introduction of cheese therein, a rotary stirrer adapted to project into the container, and means for introducing dried steam into the container, thereby to heat the cheese therein.

3. Apparatus for treating cheese comprising, in combination, a container, a cover therefor, means relatively to move the container and cover to permit introduction of cheese therein, a rotary stirrer adapted to project into the container, means for introducing dried steam into the container, thereby to heat the cheese therein, and vacuum means for drawing the steam from the container.

4. Apparatus for treating cheese comprising, in combination, a closed container having provision for opening the same to permit introduction of cheese therein, means for introducing dried steam into the container, means for stirring the cheese having provision for opening the same to permit distribution of the steam to the cheese, and vacuum means for drawing the steam from the container.

5. Apparatus for treating cheese comprising, in combination, a container adapted to receive cheese, means for conducting steam into the container and having provision for preventing moisture in the steam from entering the container, and means for stirring the cheese in the container.

6. Apparatus for treating cheese comprising, in combination, a container adapted to receive cheese, means for conducting steam into the container including a pipe positioned to cause moisture in the steam to gravitate in a direction opposite to that of the steam flowing through the pipe to the container, and means for stirring the cheese in the container, thereby to distribute the steam to the cheese and heat the same substantially uniformly throughout.

7. Apparatus for treating cheese comprising, in combination, a container adapted to receive cheese, a pipe for conducting steam into the container having a portion inclined so as to cause moisture in the steam to flow away from the container without entering the same, means for stirring the cheese, thereby to permit the steam to reach and heat the cheese uniformly, and vacuum creating means having a pipe communicating with the container for drawing steam therefrom.

8. Apparatus for treating cheese comprising, in combination, a container adapted to receive cheese, means for conducting dried steam into the container including a main pipe, a branch pipe leading upward from the main pipe for causing moisture in the steam to gravitate through the branch pipe into the main pipe, and means for permitting water of condensation to escape from the main pipe.

9. Apparatus for treating cheese, comprising, in combination, a container adapted to receive cheese, means for conducting dried steam into the container including piping having provision for causing moisture to flow through the piping in a direction opposite to that of the steam flowing to the container, and means for permitting water of condensation to escape from the piping.

10. Apparatus for treating cheese comprising, in combination, a container adapted to receive cheese, and means for conducting dried steam into the container including piping having provision for causing moisture in the steam to flow away from the container, said piping having an upstanding portion provided with an outlet and adapted to receive a column of water of condensation standing above the outlet.

11. Apparatus for treating cheese comprising, in combination, a container adapted to receive cheese, means for conducting dried steam into the container including piping having provision for causing moisture in the steam to flow away from the container, said piping having an upstanding portion provided with an outlet and adapted to receive a column of water of condensation standing above the outlet, and means for indicating the height of the water column.

12. Apparatus for treating cheese comprising, in combination, a container adapted to receive cheese, means for stirring the cheese in the container, and means for introducing steam to the stirred cheese in the container including a main pipe, a branch pipe rising from the main pipe and leading to the container, that moisture in the steam may flow downward through the branch pipe into the main pipe, a pipe adapted to receive water of condensation from the main pipe and having an outlet sufficiently small to cause a water of condensation column to stand in the pipe above the outlet, thereby to restrict escape of steam from the outlet.

13. Apparatus for treating cheese comprising, in combination, a container adapted to receive cheese, means for conducting steam into the container including nozzles spaced apart to distribute the steam into the container, and a stirrer having blades with provision for producing openings in the cheese to admit the steam delivered by said nozzles into the cheese.

14. Apparatus for treating cheese comprising, in combination, a container adapted to receive cheese, means for conducting steam into the container, and a rotary stirrer having blades substantially wedge-shaped in cross section for producing furrows in the cheese to promote distribution of the steam into the cheese.

15. Apparatus for treating cheese comprising, in combination, a container adapted to receive cheese, means for conducting steam into the container, and a stirrer having blades relatively disposed to cause the same collectively to pass through substantially all of the cheese in the container.

16. Apparatus for treating cheese comprising, in combination, a container adapted to receive cheese, means for conducting steam into the container, and a stirrer having blades disposed at angles tending to throw the cheese inward toward the center of the container.

17. Apparatus for treating cheese comprising, in combination, a kettle having a cover formed to provide a chamber, a plate for separating the chamber from the interior of the kettle, means to introduce dried steam into the kettle to heat the cheese, and means to create a partial vacuum in the cover chamber above the plate, the latter having provision to permit steam to pass from the kettle into said chamber.

18. Apparatus for treating cheese comprising, in combination, a kettle having a cover formed to provide a chamber, means to introduce steam into the kettle including nozzles, a plate separating the chamber from the kettle, said nozzles having provision for holding the plate in position, and means for producing a partial vacuum in said chamber, said plate having provision to permit the partial vacuum in said chamber to cause the steam to leave the kettle through said chamber.

19. Apparatus for treating cheese comprising, in combination, a kettle having a cover formed to provide a chamber, a plate separating the chamber from the body of the kettle and having an opening therein, a shaft projecting through the cover and the opening in the plate, a stirrer carried by the shaft and projecting into the body of the kettle, means to introduce steam into the body of the kettle to heat the cheese therein, and means for establishing a partial vacuum in said chamber and through the opening in the plate in the body of the kettle.

20. Apparatus for treating cheese comprising, in combination, a kettle having a rounded bottom portion, a stirrer having blades formed to conform to the rounded bottom portion of the kettle and having tips extending closely adjacent to the rounded bottom portion of the kettle, means for introducing steam into the kettle, and means for establishing a partial vacuum in the kettle to draw the steam therefrom.

21. Apparatus for treating cheese comprising, in combination, a support, a kettle having a cover carried by the support, a shaft carried by the support projecting through the cover, a stirrer on the shaft beneath the cover and adapted to project into the body of the kettle, means for conducting dried steam into the kettle including a pipe connected to the cover, a valve for said pipe, means for producing a vacuum effect in the kettle including a pipe connected to the cover, a valve for the vacuum pipe, and a valve on the cover operable to permit or prevent entrance of outside air in the kettle.

22. Apparatus for treating cheese comprising, in combination, a kettle adapted to receive cheese, means for stirring the cheese in the kettle, means for conducting dried steam into the kettle, means for establishing a vacuum effect in the kettle; and valve means for controlling the admission of steam into the kettle, the vacuum effect in the kettle, and admission of outside air into the kettle.

23. Apparatus for treating cheese comprising, in combination, a kettle having a body and a cover, means for supporting the cover, and means for moving the body to and from the cover comprising a pair of cylinders, pistons in said cylinders having stems for supporting the kettle, and means to control the supply of a fluid pressure to said cylinders.

24. Apparatus for treating cheese comprising, in combination, a kettle having a body and a cover, means for supporting the cover, means for establishing a vacuum effect in the kettle, and means for moving the body to and from the cover including a cylinder, a piston therein, and means for controlling the supply of a fluid to said cylinder.

25. Apparatus for treating cheese comprising, in combination, a kettle having a body and a cover, means for supporting the cover, fluid pressure actuated means for moving the body to and from the cover, and means for establishing a vacuum effect in the kettle when the body is in engagement with the cover.

26. Apparatus for treating cheese comprising, in combination, a kettle having a body and a cover, means for supporting the cover, fluid pressure means for moving the body to and from the cover, said body and cover having means to prevent leakage between them when the body is in engagement with the cover, and means for establishing a vacuum effect in the kettle.

27. Apparatus for treating cheese comprising, in combination, a kettle having a body and a cover, means for supporting the cover, fluid pressure actuated means for moving the body to and from the cover, means for guiding the body in its movements to and from the cover, and means for establishing a vacuum effect in the kettle.

28. Apparatus for treating cheese comprising, in combination, a kettle having a body and a cover, means for supporting the cover, said body being provided with a pair of trunnions; means for moving the body to and from the cover including a pair of cylinders having pistons therein, stems for said pistons having provision for receiving said trunnions, and means to control the supply of a fluid to said cylinders; and means for establishing a vacuum effect in the kettle.

29. Apparatus for treating cheese comprising, in combination, a container adapted to receive cheese, means for conducting steam into the container directly to heat the cheese, and means for establishing a vacuum effect in the container, drawing steam therefrom and having provision to prevent water of condensation from the steam from flowing back into the container.

30. Apparatus for treating cheese comprising, in combination, a container adapted to receive cheese, means for conducting dry or substantially dry steam into the container directly to heat the cheese, and vacuum establishing means including a pipe inclined from the horizontal, and a branch pipe leading therefrom to the container, thereby to produce a vacuum effect in the container for drawing air and steam therefrom, the inclination of said pipe being such that water of condensation of steam therein will not flow back into the container.

MAX O. SCHAEFER.
EMIL FREY.